US011297353B2

United States Patent
Lin et al.

(10) Patent No.: US 11,297,353 B2
(45) Date of Patent: Apr. 5, 2022

(54) NO-REFERENCE BANDING ARTEFACT PREDICTOR

(71) Applicant: Google LLC, Mountain View, CA (US)

(72) Inventors: Jessie Lin, Fremont, CA (US); Zhengzhong Tu, Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/255,016

(22) PCT Filed: Apr. 6, 2020

(86) PCT No.: PCT/US2020/026824
§ 371 (c)(1),
(2) Date: Dec. 22, 2020

(87) PCT Pub. No.: WO2021/206674
PCT Pub. Date: Oct. 14, 2021

(65) Prior Publication Data
US 2021/0321142 A1    Oct. 14, 2021

(51) Int. Cl.
*H04N 11/02* (2006.01)
*H04N 19/86* (2014.01)
(Continued)

(52) U.S. Cl.
CPC ........... *H04N 19/86* (2014.11); *H04N 19/117* (2014.11); *H04N 19/176* (2014.11); *H04N 19/40* (2014.11)

(58) Field of Classification Search
CPC .... H04N 19/86; H04N 19/117; H04N 19/176; H04N 19/40
(Continued)

(56) References Cited

U.S. PATENT DOCUMENTS

2010/0134444 A1* 6/2010 Yahata ............... G06K 9/00375
345/175
2011/0081087 A1* 4/2011 Moore ...................... G06T 7/13
382/199
(Continued)

FOREIGN PATENT DOCUMENTS

WO    2008/085377 A2    7/2008

OTHER PUBLICATIONS

Bankoski, et al., "Technical Overview of VP8, An Open Source Video Codec for the Web", Jul. 11, 2011, 6 pp.
(Continued)

*Primary Examiner* — Jayanti K Patel
*Assistant Examiner* — Richard B Carter
(74) *Attorney, Agent, or Firm* — Andrew R. Basile, Jr.

(57) ABSTRACT

A method of measuring a banding artefact in an image includes generating a gradient profile from the image, where the gradient profile includes respective gradient magnitudes of pixels of the image; generating, using the gradient profile, a candidate banding pixel (CBP) map, where each location of the CBP map is such that a gradient magnitude of the gradient profile of a corresponding pixel of the image being greater than a first threshold and smaller than a second threshold; generating, using the CBP map, a banding edge map (BEM), where the BEM includes connected banding edges of the image; generating, using the BEM, a banding visibility map (BVM), where the BVM includes a respective banding metric for at least some pixels of the image; and generating a banding index of the image using the BVM.

20 Claims, 11 Drawing Sheets

(51) Int. Cl.
*H04N 19/117* (2014.01)
*H04N 19/176* (2014.01)
*H04N 19/40* (2014.01)

(58) Field of Classification Search
USPC .............. 375/240.29; 345/175; 382/199, 266
See application file for complete search history.

(56) References Cited

U.S. PATENT DOCUMENTS

| | | | |
|---|---|---|---|
| 2013/0022288 A1* | 1/2013 | Sartor | G06T 5/002 |
| | | | 382/266 |
| 2016/0360202 A1 | 12/2016 | Xu et al. | |
| 2017/0078663 A1 | 3/2017 | Zheludkov | |
| 2017/0111645 A1* | 4/2017 | Pettersson | G06T 5/002 |
| 2020/0366899 A1* | 11/2020 | Fitzgerald | H04N 19/146 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Zhengzhong Tu et al: "BBAND Index: A No-Reference Banding Artifact Predictor", arxiv .org, Cornell University Li brary, 201 Oline Library Cornell University; Feb. 27, 2020; 5 pages.

International Search Report and Written Opinion of International Application No. PCT/US2020/026824 dated Dec. 8, 2020; 18 pages.

\* cited by examiner

NO-REFERENCE BANDING ARTEFACT PREDICTOR

BACKGROUND

Image content (e.g., of still images or frames of video) represents a significant amount of online content. For example, a web page may include multiple images, and a large portion of the time and resources spent rendering the web page are dedicated to rendering those images for display. The amount of time and resources required to receive and render an image for display depends in part on the manner in which the image is compressed. As such, an image can be rendered faster by reducing the total data size of the image using lossy compression and decompression techniques.

Lossy compression techniques seek to represent image content using fewer bits than the number of bits in the original image. Lossy compression techniques can introduce visual artefacts, such as ringing artefacts and banding artefacts, into the decompressed image. Higher compression levels can result in more observable artefacts. It is desirable to detect (e.g., measure, etc.) such artefacts (e.g., banding artefacts) so that they can be eliminated (or at least reduced).

SUMMARY

In a first aspect there is provided a method of determining an indicating of banding artefacts in an image. The method comprises: generating a gradient profile from the image, wherein the gradient profile comprising respective gradient magnitudes of pixels of the image; generating, using the gradient profile, a candidate banding pixel (CBP) map, wherein the candidate banding pixel map indicates pixels of the image having a gradient magnitude greater than a first threshold and smaller than a second threshold; generating, using the CBP map, a banding edge map (BEM), wherein the BEM indicates pixels of the CBP map that are connected with at least one other pixel of the CBP map; generating, a banding visibility map (BVM), wherein the BVM comprises a respective value for a banding metric for each pixel indicated in the BEM, each value being determined based upon corresponding pixels of the image; and determining an indication of banding artefacts in the image based upon the BVM.

Generating the BVM may comprise, for each pixel indicated in the BEM: determining a respective luminance value; determining a respective texture value; and determining, using the respective luminance value and the respective texture value, the respective banding metric for the pixel.

Generating the BVM may further comprise: obtaining a respective cardinality value for each pixel indicated in the BEM, the cardinality value indicating a number of pixels connected to the pixel in the BEM, wherein the respective banding metric of the each location is obtained further using the respective cardinality mask.

Determining an indication of banding artefacts in the image based upon the BVM may comprise: averaging at least some values of the BVM to obtain a banding index of the image. The at least some values of the BVM may correspond to a predefined percentile.

The method may further comprise: applying, to obtain an edge-preserved image, an edge-preserving filter to the image before generating the CBP map from the image.

Generating the gradient profile from the image may comprise: calculating, using a Sobel operator, the gradient profile from the edge-preserved image. That Pixels may be classified based upon respective gradient values and one or more threshold values. For example, generating the CBP may comprise determining pixels that satisfy one or more threshold values. Generating the CBP map may comprise: on a first condition that the gradient magnitude being less than the first threshold, classifying a pixel corresponding to the gradient magnitude as a flat pixel; on a second condition that the gradient magnitude being greater than the second threshold, classifying the pixel corresponding to the gradient magnitude as a texture pixel; and on a third condition that the gradient magnitude being between the first threshold and the second threshold, classifying the pixel corresponding to the gradient magnitude as a CBP.

The classifications of pixels as flat pixels and/or texture pixels may be used to filter the pixels classified as CPB pixels.

The image may be a frame of a video or may be a single image. The method may further comprise applying, using the banding index, a debanding filter to the image. The method may further comprise transcoding the video after applying the debanding filter. The debanding filter may be a smoothing filter A second aspect is an apparatus for measuring a banding artefact in an image. The apparatus includes a memory and a processor. The processor is configured to execute instructions stored in the memory to generate a gradient profile from the image, where the gradient profile includes respective gradient magnitudes of pixels of the image; generate, using the gradient profile, a candidate banding pixel (CBP) map, where each location of the CBP map is such that a gradient magnitude of the gradient profile of a corresponding pixel of the image being greater than a first threshold and smaller than a second threshold; generate, using the CBP map, a banding edge map (BEM), where the BEM includes connected banding edges of the image; generate, using the BEM, a banding visibility map (BVM), where the BVM includes a respective banding metric for at least some locations of the BEM; and determine an indication of banding artefacts in the image based upon the BVM.

A third aspect is an apparatus for measuring a banding artefact in an image. The apparatus includes a memory and a processor. The processor is configured to execute instructions stored in the memory to classify, using a gradient profile of the image, each pixel of the image as a flat pixel, a texture pixel, or a candidate banding pixel (CBP) to generate a CBP map; generate, using the CBP map, a banding edge map (BEM); generate, using the BEM, a banding visibility map (BVM), where the BVM includes a respective banding metric for at least some locations of the BEM; and generate a banding index for the image using the BVM. To generate the CBP map includes to retain, in the CBP map, pixels having neighboring pixels that are not texture pixels; apply a non-maxima suppression to the pixels of the CBP map; gap-fill between disjointed pixels of the CBP map; edge-link edges of the CBP map; and remove, from the CBP, edges that are shorter than a threshold size.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

These and other aspects of the present disclosure are disclosed in the following detailed description of the embodiments, the appended claims, and the accompanying figures.

DETAILED DESCRIPTION

Figure 1:
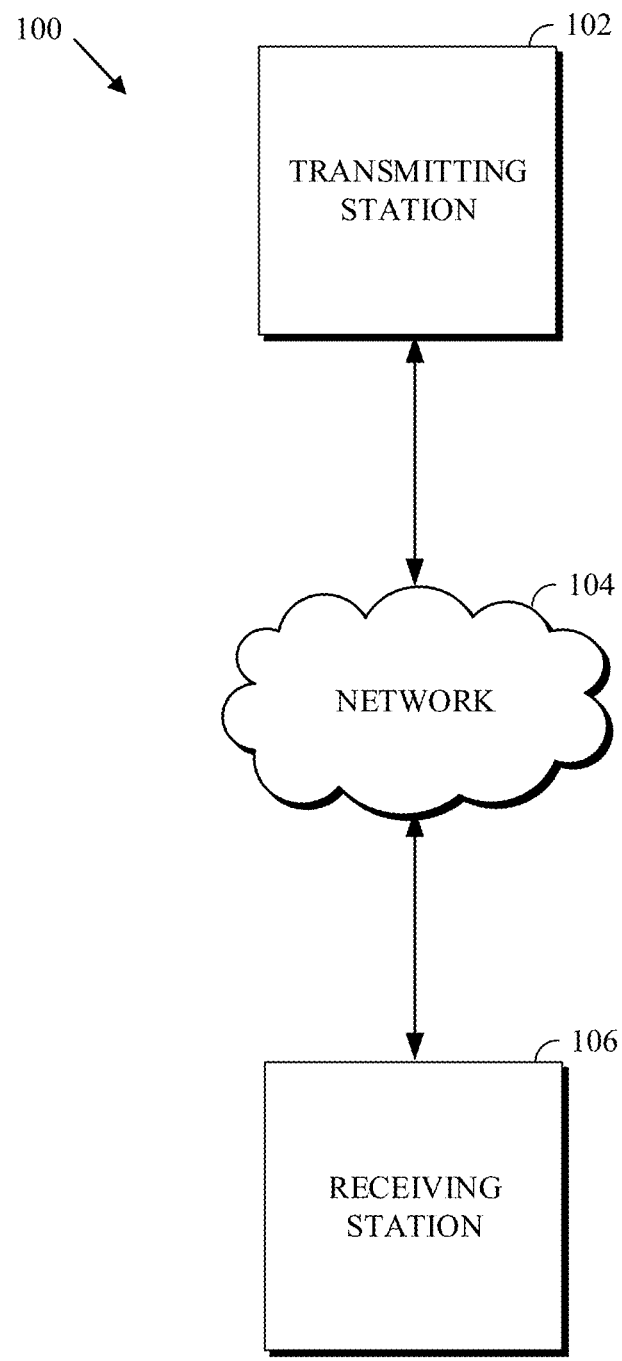
FIG. 1 is a diagram of a computing device in accordance with implementations of this disclosure.

Video compression schemes may include breaking each image (a single image or a frame of a video), into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy (in the case of video), or a combination thereof. For example, temporal (in the case of video frames) or spatial redundancies may be reduced by predicting a frame based on information available to both the encoder and decoder, and including information representing a difference, or residual, between the predicted frame and the original frame.

The residual information may be further compressed by transforming the residual information into transform coefficients. Transforming the residual information into transform coefficients can include a quantization step, which introduces loss—hence the name or term "lossy compression."

Lossy compression can be used to code visual information of an image. A lossy compression technique can be applied to a source image to produce a compressed image. The inverse of the lossy technique can be applied to the compressed image to produce a decompressed image. The lossy aspect of a lossy compression technique can be attributed, at least partially, to the quantizing of frequency domain information (as further described below). The amount of loss is dictated by a quantization step, which uses a quantization parameter (QP).

Another compression technique that can result in banding artefacts is what is referred to as palette mode (or palette-based coding). Palette-based coding can be used to code screen content, such as computer-generated video with substantial amounts of text and graphics. Palette-based coding can result in decoded images that include artefacts, such as staircasing artefacts. For example, source images may include local gradients that result from the point-spread-function of a capturing device, from anti-aliasing effects of the imaged structures, or from naturally and slowly developing image structures. For such images, palette-based coding may result in image artefacts, such as artificial staircasing, in the decoded (i.e., reconstructed) images. Such staircasing artefacts may also be referred to as banding artefacts.

An example of palette-based coding artefacts is now presented. Assume that an image is that of a glossy whiteboard upon which light sources are shined at different locations. As such, the image of the whiteboard may include small gradients and transition areas from white to light grey. Palette-based encoding the image may create banding effects, as described above. That is, for example, instead of gradual color changes, some bands (e.g., 16 bands) of grey may show in the decoded image where hard, artificial borders may form in the decoded image.

Figure 6:
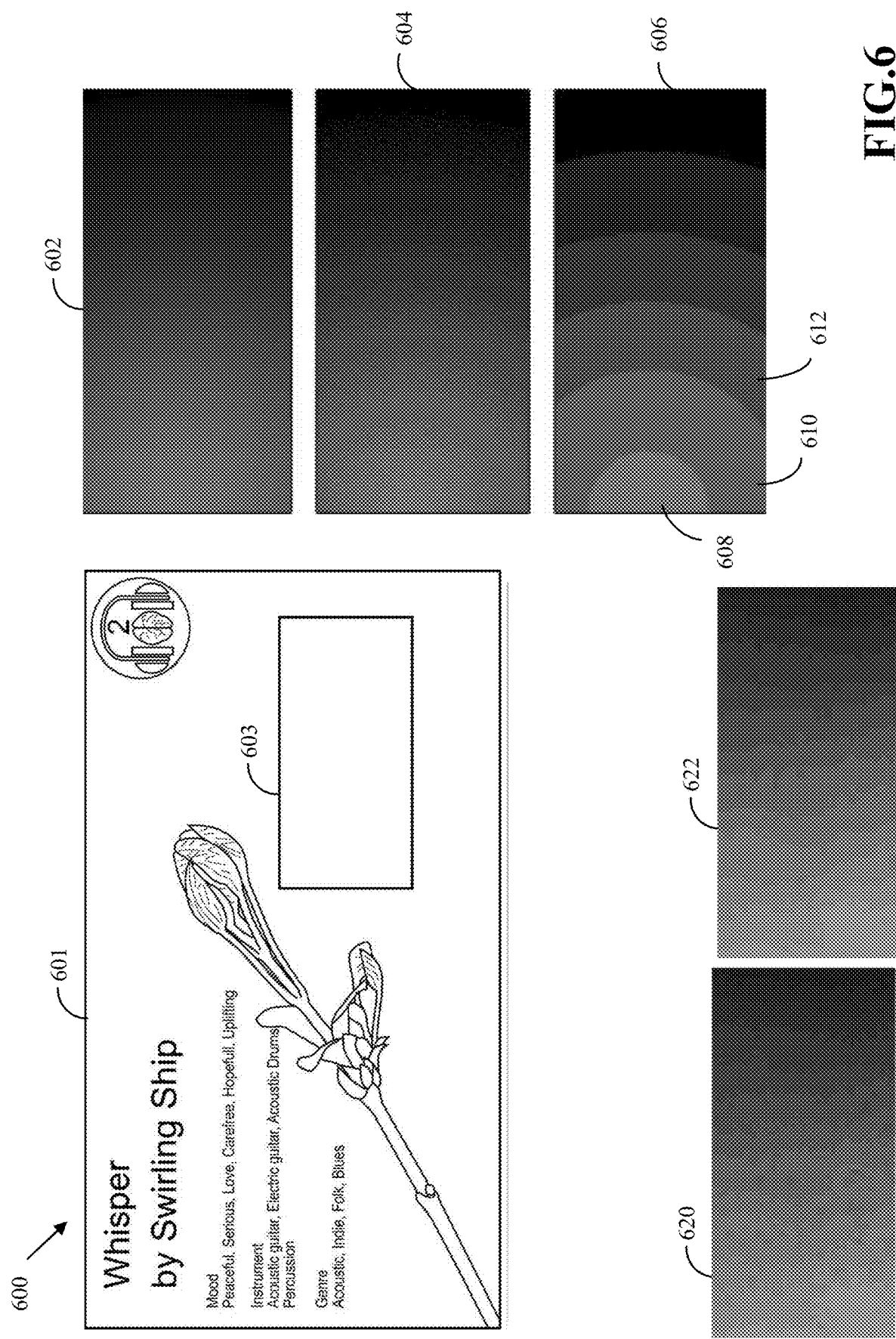
FIG. 6 is an illustration of an example 600 of staircasing.

FIG. 6 is an illustration of an example 600 of staircasing. In an example, the staircasing can be due to palette-based coding. The example 600 includes a source image 601 and a portion 603, which is shown as a zoomed region in a source image portion 602. The source image 601 and the portion 603 include many colors. However, for clarity of the image, the source image 601 and the portion 603 are shown in black and white. As such, the source image portion 602 can include several colors; however, the source image portion 602 is shown here in monochrome colors for reproduction reasons and clarity. The source image portion 602 illustrate smooth and gradual transitions between different shades of grey. A palette-based decoded representation 604 and a palette-based decoded representation 606 of the source image portion 602 illustrate staircasing effects. The staircasing effects can be more prominent, as shown in the palette-based decoded representation 606, when fewer colors are used in the palette used to encode and decode the source image portion 602. Whereas the source image portion 602 includes smooth color transitions, color bands (such as color bands 608, 610, 612) are formed in the palette-based decoded representation 606.

In an example scenario, the source image 601 may be a frame of a user-generated content (UGC) video. The video may be encoded and uploaded (or uploaded and then encoded) to a content delivery service (e.g., YouTube). Image portion 620 may be part of the encoded and uploaded UGC video. Thus, the image portion 620 can be an encoded version of the source image portion 602.

The content delivery service may transcode a UGC video to accommodate different resolution, bitrate, aspect ratio, quality, network bandwidth, and/or like criteria. Further encoding an already encoded image that includes banding artefacts can further exacerbate the banding artefacts in at least some of the transcoded versions. For example, an image portion 622 is a transcoded and re-encoded version of the image portion 620.

Implementations according to this disclosure predict (e.g., measure) banding artefacts in an image using a distortion-specific, no-reference quality model. "No-reference," as used herein, means that a compressed image (a single image or a frame of a video) of a source image is not compared to the source image to calculate (e.g., measure) the banding artefact. A video quality model, referred to below as Blind BANding Detector (BBAND) calculates a banding metric (e.g., a banding index), referred to as a BBAND index. BBAND is inspired by human visual models. BBAND can generate a pixel-wise banding visibility map and can output a banding severity score (i.e., the BBAND index) of an image. A BBAND index can be generated for an image and/or a video that includes the image.

Predicting banding artefacts allows the effect of compression on an image to be understood and used in various ways. For example, in some embodiments the image can be modified to remove or improve the predicted banding artefacts. It will, however, be appreciated that predicting banding artefacts provides useful information in itself and that modifying the image to remove banding artefacts is only one use of such information. For example, in some embodiments the predicted banding artefacts may be used to modify the image compression technique applied to an image.

By measuring the BBAND index, noise (e.g., a debanding filter) can be added to the UGC prior to transcoding the UGC. The amount of noise (e.g., the debanding filter strength) can depend on the BBAND index. This scenario is referred to below as debanding via pre-processing. The pre-processing scenario is described below with respect to FIG. 7A.

In another example, the UGC can be transcoded into one or more versions. A user device that receives one of the transcoded versions, can estimate the BBAND index and apply a debanding filter prior to displaying (or saving) the one version at the user device. This scenario is referred to below as debanding via post-processing. The post-processing scenario is described below with respect to FIG. 7B.

A highly reliable banding detector (i.e., the BBAND) for original user-generated content (UGC) and/or for transcoded then re-encoded videos, can be used (such as by a streaming content delivery system) in developing measures to avoid (e.g., reduce, eliminate, etc.) banding artefacts in streaming videos. The BBAND model described herein leverages edge detection and a human visual model. The BBAND model operates on individual frames to generate a pixel-wise banding visibility map (BVM). The BBAND model can also produce no-reference perceptual quality predictions of videos with banding artifacts.

The BBAND model (i.e., banding detector) described herein can generate a pixel-wise banding visibility map (BVM). Based on an observation that banding artefacts appear as weak edges with small gradients (whether clean or noisy), the banding detector can exploit edge detection techniques as well as certain visual properties (e.g., visual masking). A spatio-temporal visual importance pooling can then be applied to the BVM to yield a completely blind (i.e., no-reference) banding score for an individual image and/or an entire video (or portions thereof).

Details of no-reference banding artifact predictor are described herein with initial reference to a system in which and/or in conjunction with which the teachings herein can be implemented.

FIG. 1 is a schematic of a video encoding and decoding system 100. A transmitting station 102 can be, for example, a computer having an internal configuration of hardware, such as that described with respect to FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
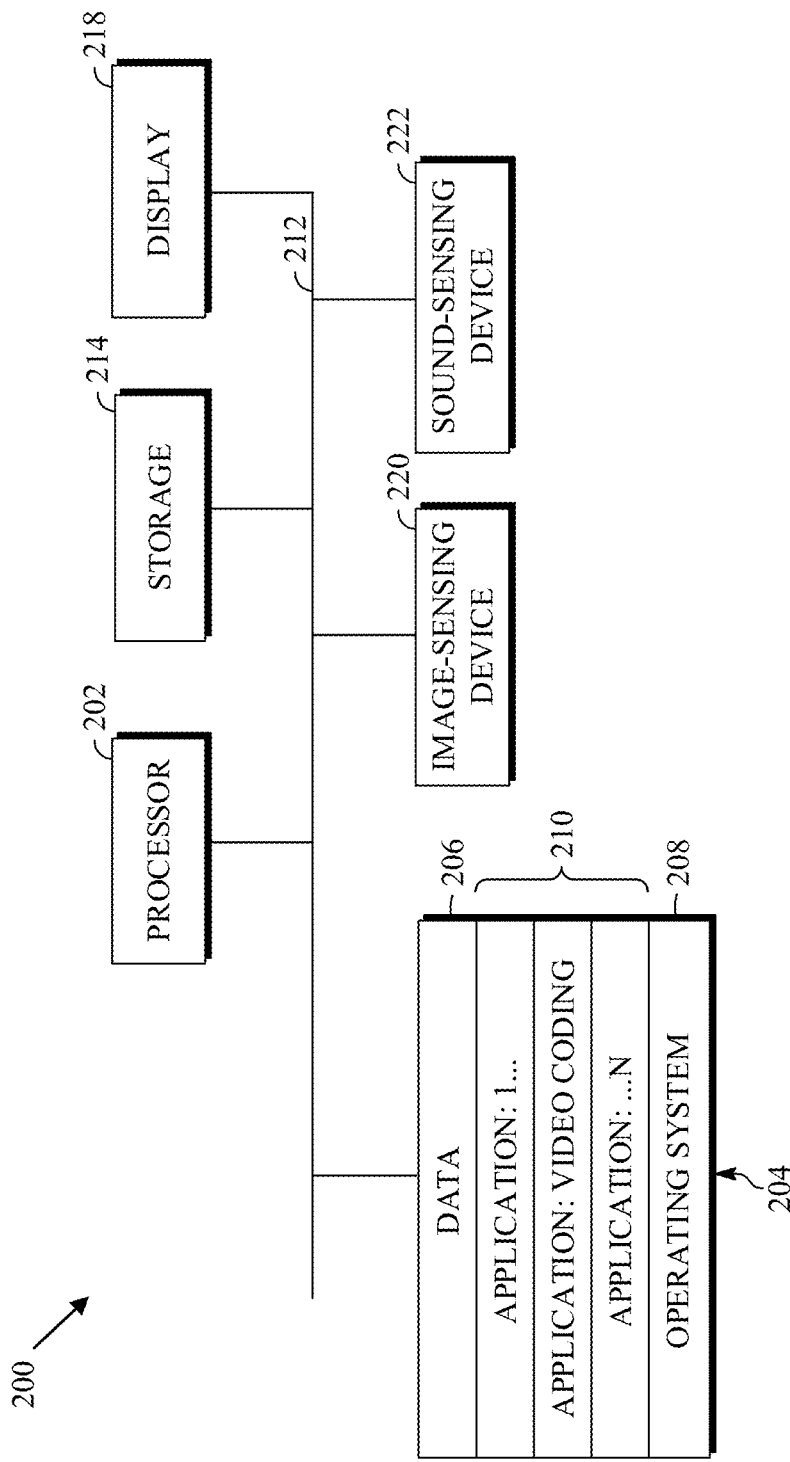
FIG. 2 is a diagram of a computing and communications system in accordance with implementations of this disclosure.

In one example, the receiving station 106 can be a computer having an internal configuration of hardware, such as that described with respect to FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP (e.g., an HTTP-based video streaming protocol) may be used.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, now-existing or hereafter developed, capable of manipulating or processing information. Although the disclosed implementations can be practiced with a single processor as shown (e.g., the CPU 202), advantages in speed and efficiency can be achieved by using more than one processor.

In an implementation, a memory 204 in the computing device 200 can be a read-only memory (ROM) device or a random-access memory (RAM) device. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform at least some of the techniques described herein. For example, the application programs 210 can include applications 1 through N, which further include a BBAND that performs at least some of the techniques described herein. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD); a cathode-ray tube (CRT) display; or a light-emitting diode (LED) display, such as an organic LED (OLED) display.

The computing device 200 can also include or be in communication with an image-sensing device 220, for example, a camera, or any other image-sensing device, now existing or hereafter developed, that can sense an image, such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines, such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit, such as a memory card, or multiple units, such as multiple memory cards. The computing device 200 can thus be implemented in a wide variety of configurations.

Figure 3:
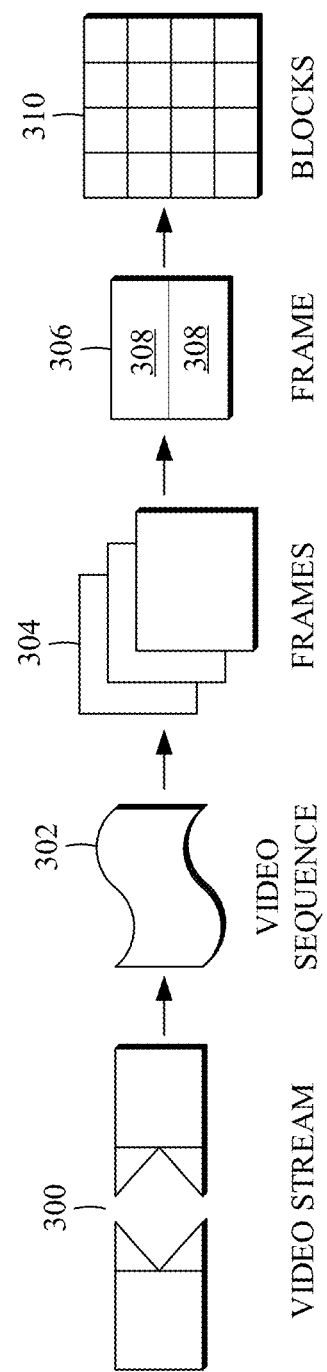
FIG. 3 is a diagram of a video stream for use in encoding and decoding in accordance with implementations of this disclosure.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size, such as 4×4 pixels, 8×8 pixels, 16×8 pixels, 8×16 pixels, 16×16 pixels, or larger.

Figure 4:
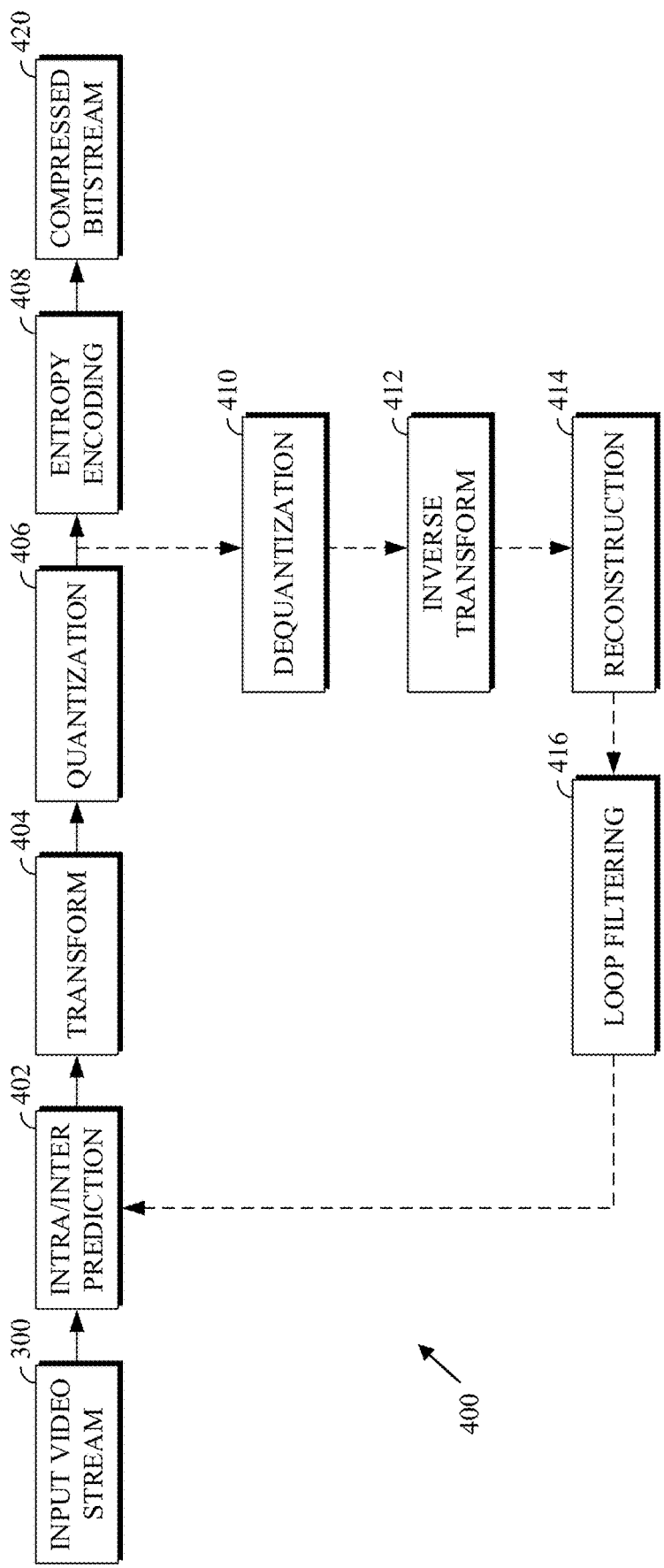
FIG. 4 is a block diagram of an encoder in accordance with implementations of this disclosure.

FIG. 4 is a block diagram of an encoder 400 in accordance with implementations of this disclosure. The encoder 400 can be implemented, as described above, in the transmitting station 102, such as by providing a computer software program stored in memory, for example, the memory 204. The computer software program can include machine instructions that, when executed by a processor, such as the CPU 202, cause the transmitting station 102 to encode video data in manners described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination of both. In any case, a prediction block can be formed. In the case of intra-prediction, all or part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms (i.e., transform types) include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix, and the highest frequency coefficient is at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block (which may include, for example, the type of prediction used, transform type, motion vectors, and quantizer value), are then output to the compressed bitstream 420. The information to decode the block may be entropy coded into block, frame, slice, and/or section headers within the compressed bitstream 420. The compressed bitstream 420 can also be referred to as an encoded video stream or encoded video bitstream; these terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process and that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion, such as blocking artefacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
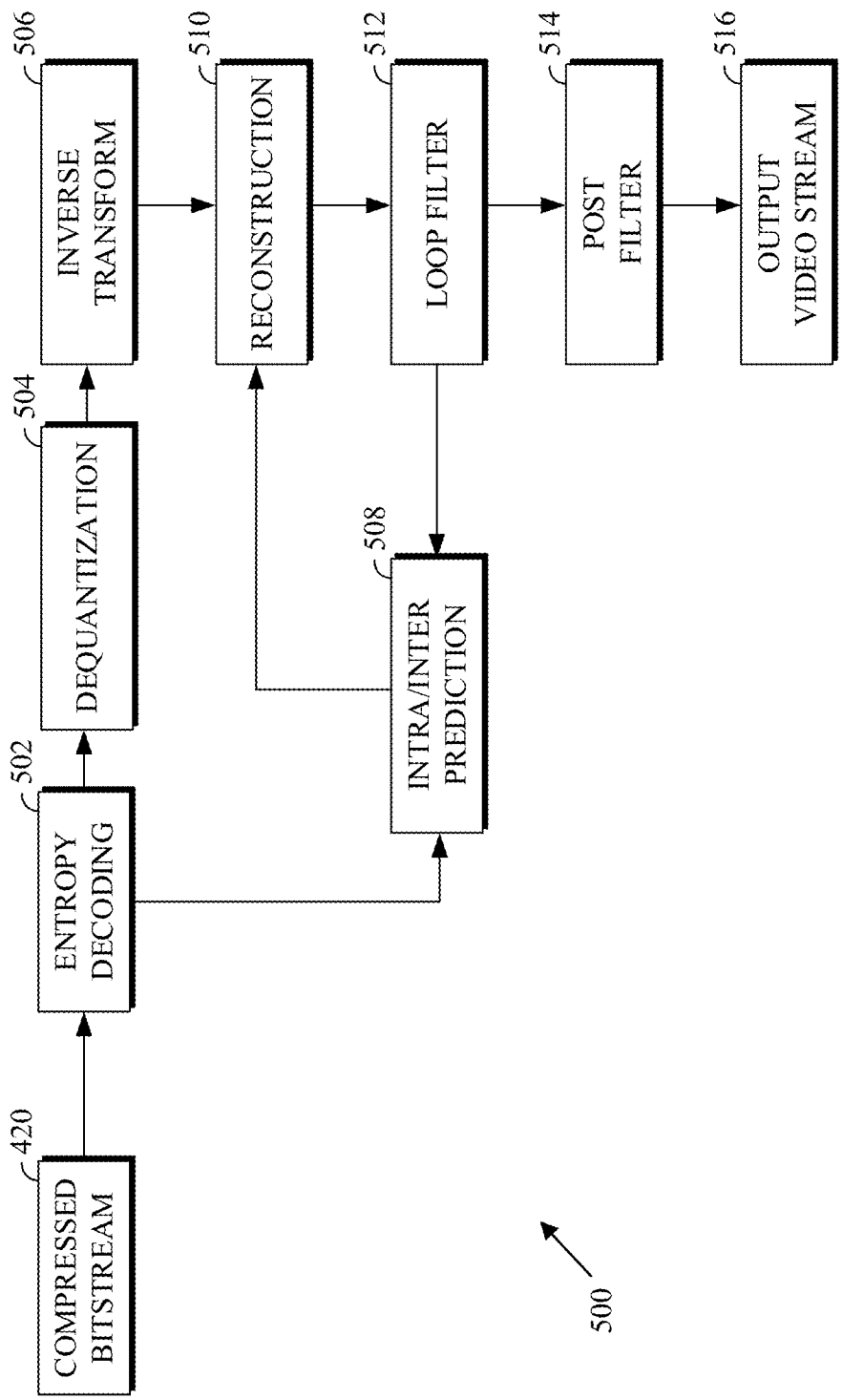
FIG. 5 is a block diagram of a decoder in accordance with implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor, such as the CPU 202, cause the receiving station 106 to decode video data in the manners described below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512, and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, for example, at the intra/inter-prediction stage 402. At the reconstruction stage 510, the prediction block can be added to the derivative residual to create a reconstructed block. The loop filtering stage 512 can be applied to the reconstructed block to reduce blocking artefacts. Other filtering can be applied to the reconstructed block. In an example, the post filtering stage 514 is applied to the reconstructed block to reduce blocking distortion, and the result is output as an output video stream 516. The output video stream 516 can also be referred to as a decoded video stream; these terms will be used interchangeably herein.

Other variations of the decoder 500 can be used to decode the compressed bitstream 420. For example, the decoder 500 can produce the output video stream 516 without the post filtering stage 514. In some implementations of the decoder 500, the post filtering stage 514 is applied after the loop filtering stage 512. The loop filtering stage 512 can include an optional deblocking filtering stage. Additionally, or alternatively, the encoder 400 includes an optional deblocking filtering stage in the loop filtering stage 416.

Figure 7A:
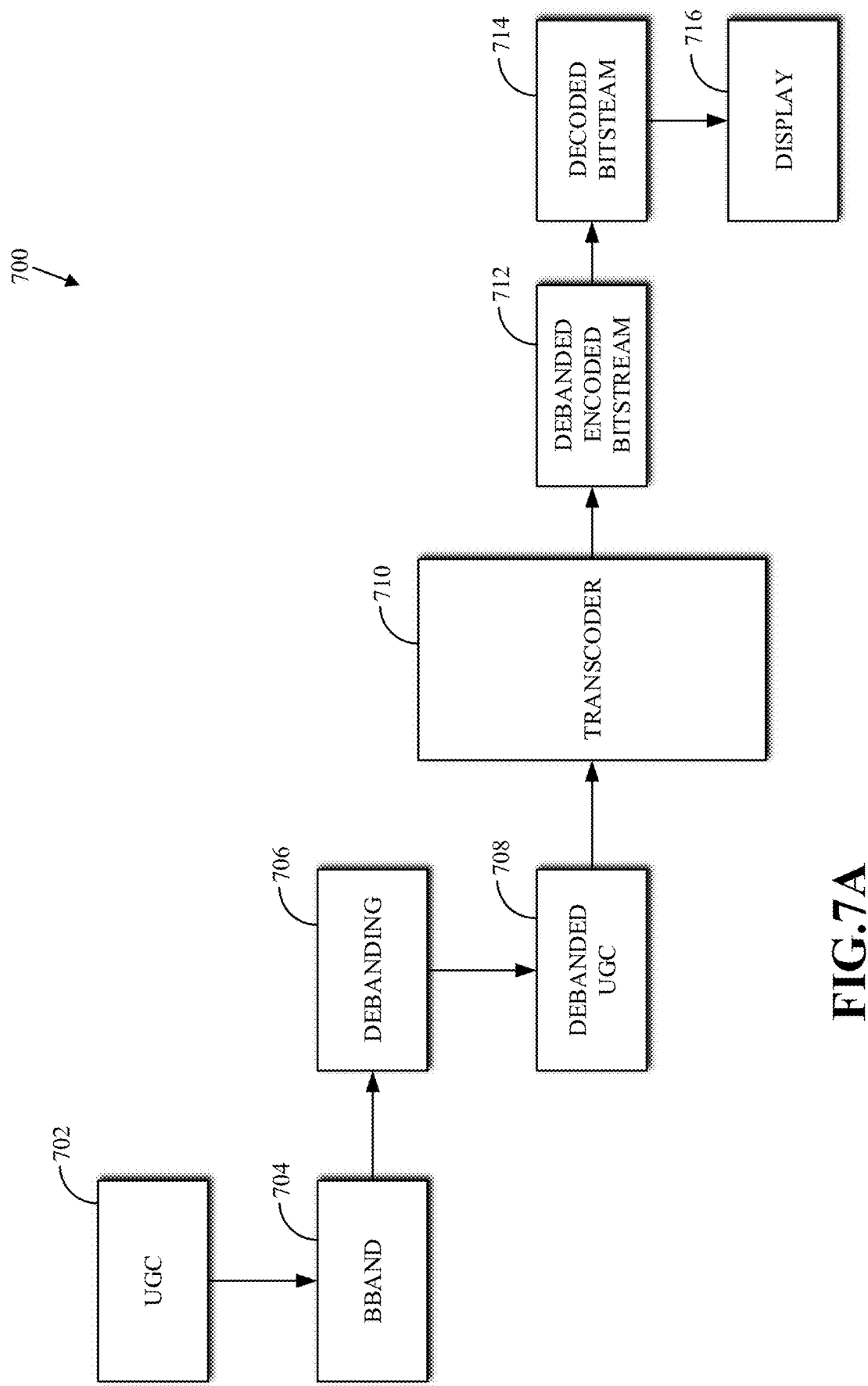
FIG. 7A is an example of using blind banding detection in a pre-processing scenario according to implementations of this disclosure.

FIG. 7A is an example 700 of using blind banding detection in a pre-processing scenario according to implementations of this disclosure. In the example 700, a BBAND detector is used prior to transcoding a user-generated content (UGC). The BBAND detector determines a banding index (i.e., BBAND index) for the UGC. A debanding operation can be applied to the UGC prior to transcoding.

A UGC 702 may be received at a content delivery system. The content delivery system can receive UGC, transcode the UGC according to different parameters and generate respective versions of the UGC.

In an example, the UGC 702 can be output by an encoder, such as the encoder 400 of FIG. 4. Thus, the UGC 702 can be the compressed bitstream 420 of FIG. 4. A blind banding detector (i.e., a BBAND 704) determines a banding index for the UGC 702. More accurately, the BBAND 704 determines a banding index for a decoded version of the UGC 702. Thus, while not specifically shown in FIG. 7A, the UGC 702 can be decoded prior to being input to the BBAND 704. The UGC 702 can be decoded by a decoder, such as the decoder 500 of FIG. 5. Thus, the input to the BBAND 704 can be the output video stream 516 of FIG. 5.

A debanding module 706 can use the BBAND index determined by the BBAND 704 to apply a debanding operation to the decoded UGC 702. A debanded and decoded UGC 708 can be generated from the debanding module 706. The debanded and decoded UGC 708 can then be input to a transcoder 710, which outputs one or more versions of the debanded and decoded UGC 708, including a debanded and encoded bitstream 712. The debanded and encoded bitstream 712 can be received at a device, such as the receiving station 106 of FIG. 1. The debanded and encoded bitstream 712 can be decoded at the device to generate a decoded bitstream 714, which can be as described with respect to the output video stream 516 of FIG. 5. The output video stream 516 can then be displayed at a display 716 of the device. In another example, the debanded and encoded bitstream 712 can be delivered to the device using a streaming protocol, such as HTTP live streaming (HLS), or some other streaming protocol.

In an example, the debanding module 706 can adjust one or more degrees of smoothing to enhance the detected banding edges, which are described below. In a first operation, a banding edge map (BEM) can be extracted from each individual frame. In a second operation, a M×N (e.g., 32×32, larger, or smaller) dithering window of independent and identically distributed (i.i.d.) uniform noise (e.g., in a range [−2, 2] or some other range) can be added to each pixel independently at the Y (i.e., luminance) plane only. For each pixel of the BEM, noise can be added in a window that is centered at the pixel. The window can be of size M×N. In an example, the window can be 2×2 pixels, 3×3 pixels, or some other size. The debanding module 706 can perform other debanding operations/techniques using the BBAND index.

Figure 7B:
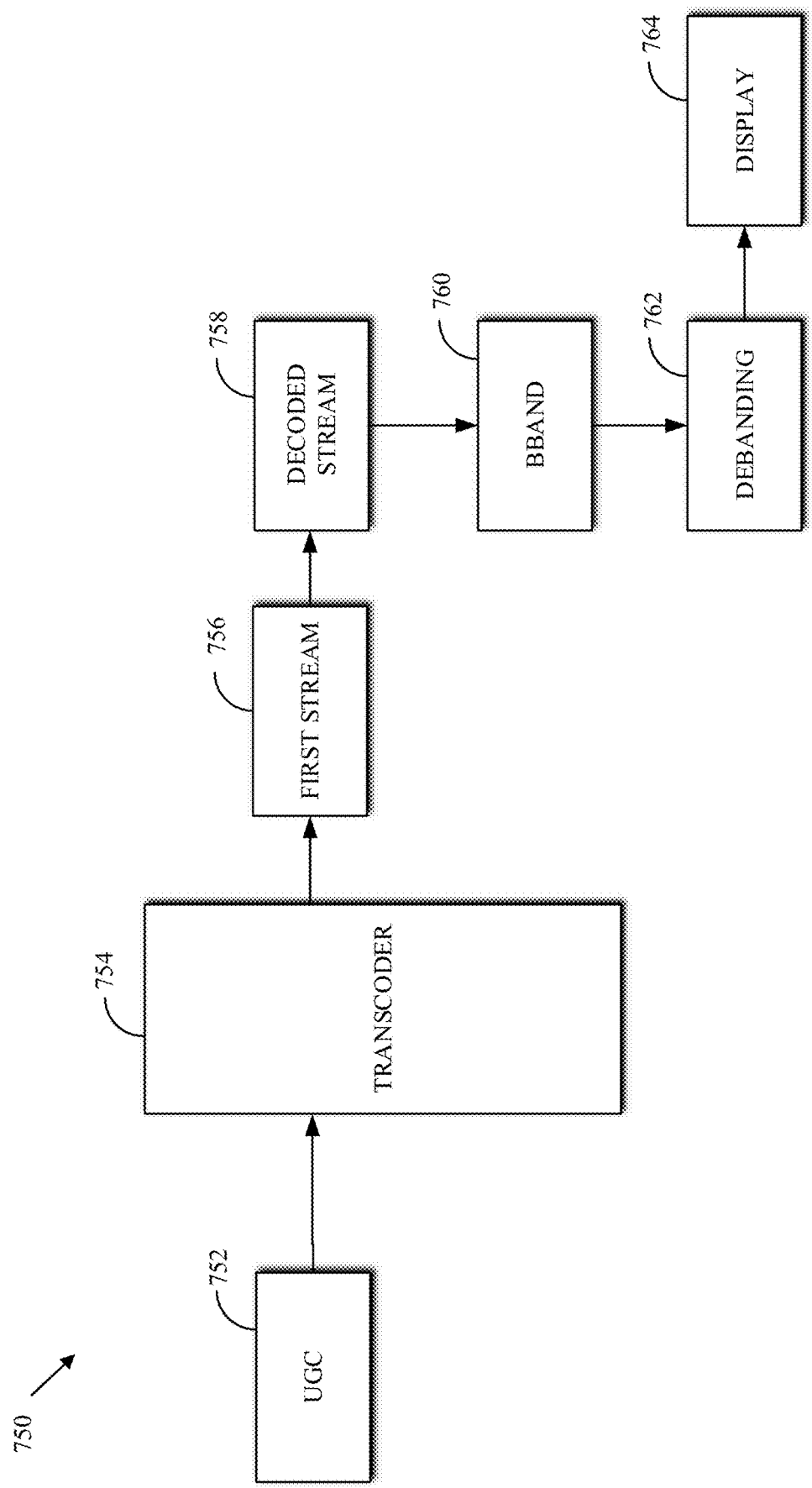
FIG. 7B is an example of using blind banding detection in a post-processing scenario according to implementations of this disclosure.

FIG. 7B is an example 750 of using blind banding detection in a post-processing scenario according to implementations of this disclosure. In the example 750, a BBAND 760 can be used, such as at a client device, to deband a received compressed bitstream. In some examples the compressed bitstream can be streamed to the device using a streaming protocol (e.g., HLS). The BBAND detector can determine a banding index (i.e., BBAND index) for a received compressed bitstream (e.g., for one or more frames therein). A debanding module 762 can perform debanding on one or more frames of the received compressed bitstream. In an example, the BBAND 760 and the debanding module 762 can be, or can be part of, a post filtering stage, such as the post filtering stage 514 of FIG. 5.

A UGC 752 can be received by a transcoder 754. The UGC 752 can be as described with respect to the UGC 702 of FIG. 7A. The transcoder 754 outputs one or more versions of the UGC 752, including a first stream 756. The first stream 756 can be received at a device, such as the receiving station 106 of FIG. 1. The first stream 756 can be the compressed bitstream 420 of FIG. 5. At the device, the first stream 756 is decoded to produce a decoded stream 758. The BBAND 760 can determine respective BBAND indexes for at least some of the decoded frames of the decoded stream 758. The debanding module 762 can perform debanding on the at least some of the decoded frames according to their respective BBAND indexes to generate debanded frames.

The debanded frames can then be displayed at a display 764 of the device, such as the display 218 of FIG. 2.

Figure 8:
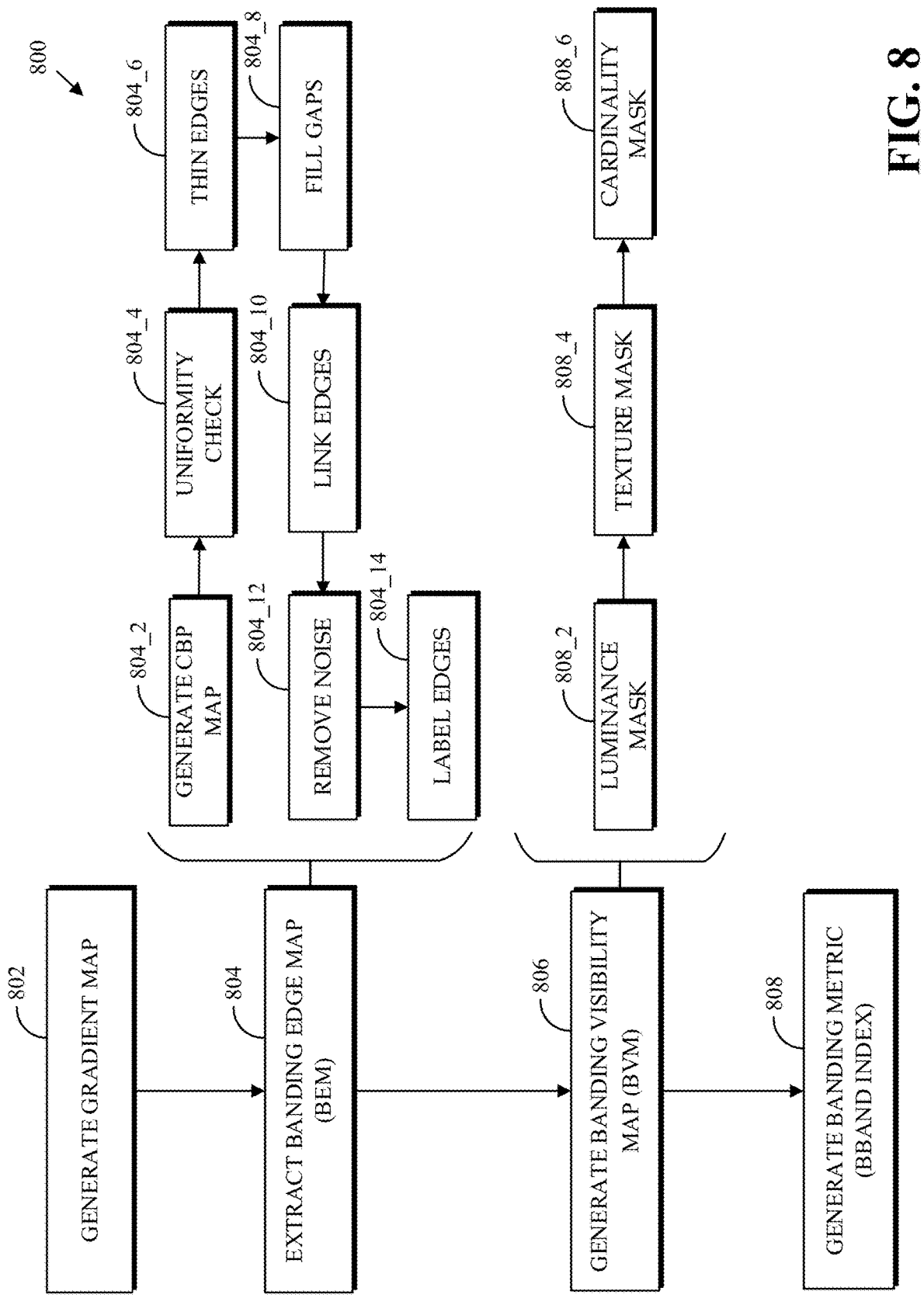
FIG. 8 is an example of a flowchart of a technique 800 for no-reference banding artefact predictor according to implementations of this disclosure.

FIG. 8 is an example of a flowchart of a technique 800 for no-reference banding artefact predictor according to implementations of this disclosure. The technique 800 can be implemented, for example, as a software program that may be executed by computing devices such as transmitting station 102 or receiving station 106. The technique 800 can be implemented by a software program that may be executed partially or fully by one of a blind banding detector and/or a debanding module, such as the BBAND 704 and the debanding module 706 of FIG. 7A, or the BBAND 760 and the debanding module 762 of FIG. 7B. The software program can include machine-readable instructions that may be stored in a memory such as the memory 204 or the secondary storage 214, and that, when executed by a processor, such as CPU 202, may cause the computing device to perform the technique 800. The technique 800 may be implemented in whole or in part in the post filtering stage 514 of the decoder 500. The technique 800 can be implemented using specialized hardware or firmware. Multiple processors, memories, or both, may be used.

The technique 800 can receive an image or a frame of a video. The technique 800 calculates a banding index (also referred herein as a BBAND index, BBAND metric, or a banding metric) for the image. In an example, the technique 800 can receive the video and the technique 800 can calculate a respective banding index for at least some of the frames of the video. The video can be a decoded bitstream that is produced by a decoder, such as the decoder 500 of FIG. 5. Thus, the video can be the output video stream 516 of FIG. 5. In an example, the technique 800 can receive a compressed bitstream, such as the compressed bitstream 420. In such a case, the technique 800 can include steps for decoding the compressed bitstream to produce an output video stream.

In an example, the image can be a RGB image. In such a case, the image can be converted to the YUV color space. Any processing described with respect to the image, or actions performed with respect to the image, are to be construed as being performed with respect to (e.g., on) a selected one of the Y, U, or V planes. In an example, the selected plane can be the luminance (i.e., Y) plane of the YUV image. More specifically, the technique 800 can be used to measure a banding artefact using the luminance plane of the image. Thus, any references to a pixel or a pixel value at a location of the image can be interpreted to mean a luminance value of the pixel at that location.

In an example, the technique 800 can include pre-processing the image. Pre-processing the image can include applying an edge-preserving filter smoothing filter to the image. Applying the edge-preserving filter to the image can be useful if the image is to be re-encoded, such as in the case of transcoding the video. Re-encoding the video, such as at bitrates optimized for streaming, can exacerbate banding in videos that already exhibit slight banding artifacts that may be barely visible in the video itself.

In an example, the edge-preserving filter can be the bilateral filter. In an example, the edge-preserving filter can be a self-guided filter. Self-guided filtering of the image uses the image itself to influence the filtering. Self-guided image filtering is a neighborhood operation. That is, the filter to be applied to a pixel of the image takes into account the statistics of a region (e.g., a 2×2, 3×3, or some other window or neighborhood) of the pixel. Other edge-preserving filters can be used. Edge-preserving filters that preserve the gradient profile in the pre-processed image are preferred. For example, the self-guided filter can be preferable over the bilateral filter since the self-guided filter better preserves the gradient profile.

Whether an edge-preserving filter is applied to the image or not, at 802, the technique 800 generates (e.g., calculates, obtains, etc.) a gradient profile, denoted G. For each pixel of the image, the gradient profile G includes a respective gradient magnitude. The gradient profile G can be obtained using a Sobel operator. The Sobel operator performs a 2-D spatial gradient measurement on the image. Thus, the Sobel operator can emphasize regions of high spatial frequency corresponding to edges with the corresponding directions in the image block.

At 804, the technique 800 extracts a banding edge map (BEM). The BEM includes connected banding edges of the image, as described below. In an example, extracting the BEM can include generating 804_2 a candidate banding pixel (CBP) map, performing a uniformity check 804_4 on the CBP map, edge-thinning 804_6 the map resulting from the uniformity check, gap-filling 804_8 the map resulting from the edge-thinning, and removing noise 804_10 from the map resulting from the gap filling. Extracting the BEM can include more, fewer, other operations, or a combination thereof. For example, in some implementations, at least one of the uniformity check 804_4, the edge-thinning 804_6, the gap-filling 804_8, or the removing noise 804_10 may not be performed.

At 804_2, generating the CBP map can include classifying the pixels of the image into flat pixels, texture pixels, or candidate banding pixels (CBPs); and generating the CBP map from the pixels that are classified as CBPs. The pixels classified as CBP pixels make up (e.g., constitute, form, etc.) the CBP map.

Flat pixels can be those pixels whose gradient magnitude (i.e., the absolute value of the gradient) is less than a first threshold, T1. That is, if $|G(x, y)|<T1$, then the pixel at (x, y) is classified as a flat pixel. Texture pixels can be those pixels whose gradient magnitude (i.e., the absolute gradient) is greater than a second threshold, T2. That is, if $|G(x, y)|>T2$, then the pixel at (x, y) is classified as a texture pixel. CBP pixels are those whose gradient magnitude is between the first and the second thresholds. That is, if $T1<|G(x, y)|<T2$, then the pixel at (x, y) is classified as a CBP pixel. All flat pixels can form a flat binary map; all texture pixels can form a texture binary map; and all CBP pixel can form a CBP binary map (i.e., a CBP map). In an example, the first threshold T1 is equal to 2, and the second threshold T2 is equal to 12. However, other values are possible.

Figure 9:
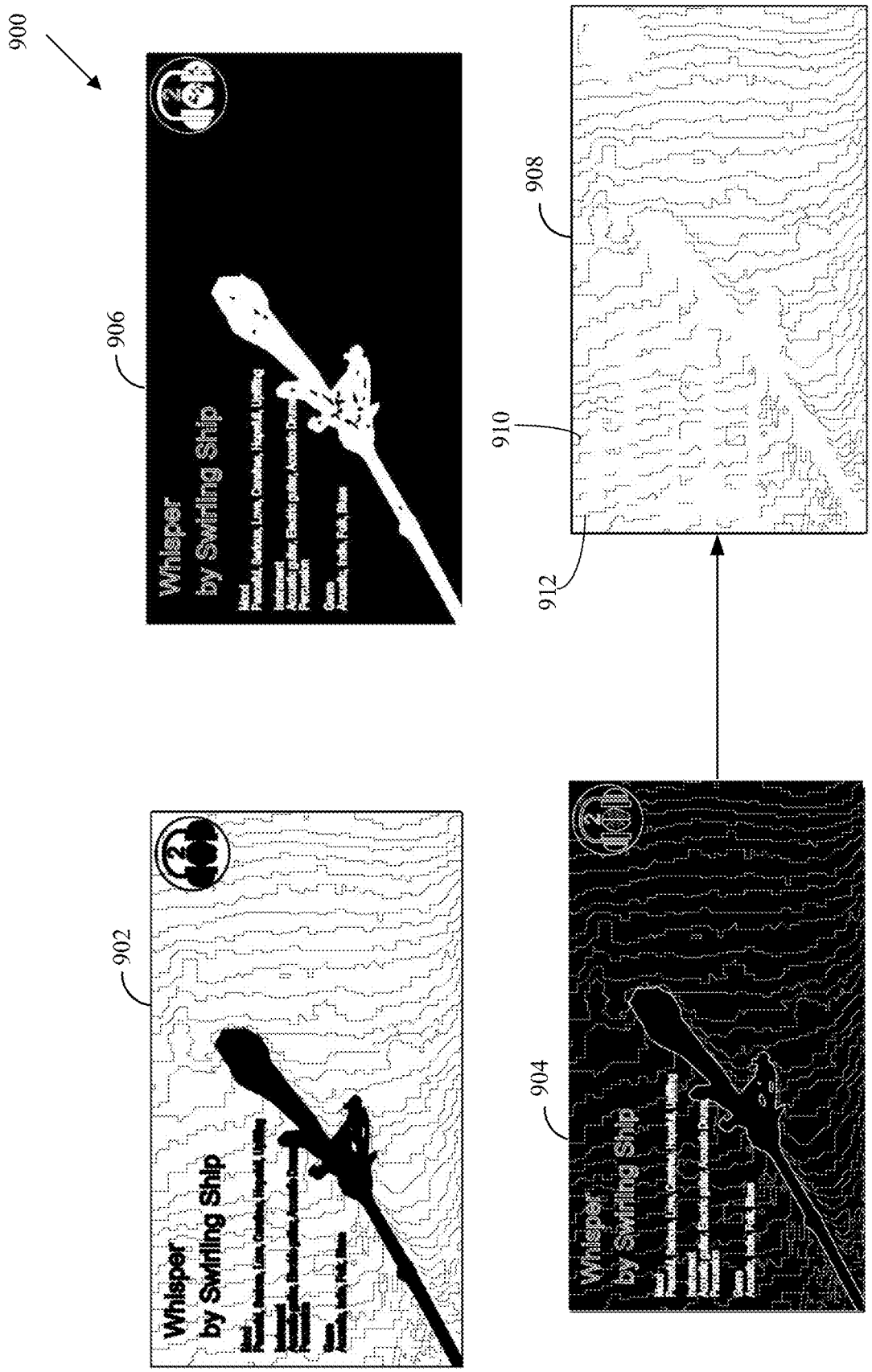
FIG. 9 is an illustration of an example of binary maps including a candidate banding binary map (BEM) according to implementations of this disclosure.

FIG. 9 is an illustration of an example 900 of binary maps including a candidate banding binary map (BEM) according to implementations of this disclosure. A binary map 902 illustrates a flat binary map of a decoded image of the source image 601 of FIG. 6. A binary map 904 illustrates a CBP map of the decoded image of the source image 601 of FIG. 6. A binary map 906 illustrates a texture map of the decoded image of the source image 601 of FIG. 6. In each of the binary maps 902, 904, 906, black values (e.g., Boolean value 1) correspond to pixels of the decoded image that satisfy the classification criterion of that binary map and light values (e.g., Boolean value 0) correspond to pixels of the decoded image that do not satisfy the classification of that binary map.

A banding edge map (BEM) 908 is generated from the binary map 904, as further described below. That is, the CBP map is processed further, as described below, to generate the BEM 908. In the description below, the described operations can alter the CBP. After each operation, a resultant CBP map (i.e., a modified CBP map) may be generated. In another example, each operation may create a new resultant CBP map without modifying the CBP map that is used as input to the operation. In either case, the outputs of an operation is referred be below as a resultant CBP map.

At 804_4, the technique 800 can perform a uniformity check on the CBP map. The technique 800 removes from the CBP map those CBPs whose neighbors are texture pixels. Said another way, the technique 800 retains in the CBP map only the CBPs whose neighbors (e.g., at least one of the neighbors in a defined neighborhood) are either flat pixels or CBPs. In an example, for a given CBP pixel of the binary map 904, the technique 800 can use the binary maps 902, 904, and/or 906 to determine whether the pixel should be removed from the CBP map. Removing the pixel from the CBP map can mean to change the value in CBP map corresponding to the pixel location in the image to a 0. In an example, the neighborhood can be the immediately neighboring, non-diagonal four pixels centered at the pixel itself. In an example, the neighborhood can be defined by a N×N (where N>1) window that is centered at the pixel. Other defined neighborhoods are possible.

At 804_6, the technique 800 can perform edge-thinning on the resultant CBP map. The edges extracted in the CBP map may be blurred. Thus edge-thinning can be used to suppress all the gradient values except the local maxima, which indicate locations with the sharpest change of intensity value. In an example, the technique 800 can apply non-maxima suppression to each remaining CBP in the resultant CBP map along the Sobel gradient orientation of the pixel so that any potential bands can be better localized. Thus, non-maximum suppression can be used to eliminate spurious response to edge detection. Other edge-thinning techniques can be used. As a result of the edge-thinning, some values of the resultant CBP map may be changed so that they are no longer classified as CBPs. For example, whereas a value may be 1 before the edge-thinning, the technique 800 may switch the value to 0 as a result of the non-maximum suppression.

At 804_8, the technique 800 can fill gaps in the resultant CBP map. If two candidate pixels of the resultant CBP map are disjoint, but able to be overlapped by an overlapping operator, the gap between the two points can be filled by a proper banding edge. For example, the edges detected as described above may result in disjointed edges which should have been recognized as one edge. For example, noise in the image may prevent precise and accurate detection of the edges. In an example, the overlapping operator can be a binary circular blob.

If two proximal edges are such that an end pixel (e.g., a last pixel) of a first edge is within a certain distance of a beginning pixel (e.g., a first pixel) of a second edge, then the edges can be connected so that they can be regarded as part of a same edge. As such, the gap between the first edge and the second edge can be filled. That is, in the resultant CBP map, the values corresponding to the locations that are in the gap between the first edge and the second edge can be set to 1 so that they are now classified as CBP pixels.

In an example, the certain distance can be five (5) pixels. However, other distances can be used. That is, the overlapping operator (e.g., the binary circular blob) can be a circle of a radius that is the certain distance. The circular blob can be thought of as being placed in the gap between the first edge and the second edge. If the circular blob completely fills (e.g., the end pixel of the first edge and the beginning pixel of the second edge fall within the overlapping operator), then the first edge and the second edge are connected; otherwise, they are not.

At 804_10, the technique 800 can link together all connected CBPs in lists of sequential edge points. Each edge can be either a curved line, a loop, or a straight line. As described above, the resultant CBP is a binary map that contains one value (e.g., Boolean value 1) for pixels of banding edges and another value (e.g., Boolean value 0) for pixels that are not pixels of banding edges. As such, the technique 800 can group each set of connected (e.g., continuous) pixels, that are banding edge pixels into a line. In an example, the technique 800 can link together the connected CBPs using connected component labeling in the CBP binary map.

At 804_12, the technique 800 can remove linked edges that are shorter than a certain threshold length. Edges that are shorter than a threshold length can be discarded as visually insignificant and can be considered noise. In an example, the threshold length can be 16 pixels. However, other threshold lengths are possible. Discarding an edge can mean switching, in the resultant CBP map, the values corresponding to the pixels of the edge from 1 to 0.

At 804_14, the technique 800 can label the edges. That is, the resulting connected banding edges can be labeled separately, defining the ultimate banding edge map (BEM) (i.e., the BEM 908 of FIG. 9). Each line can be given a label. In an example, each identified connected line can be uniquely identified (such as using a sequential number). The result of the this operation can be a set of edges {Edge1, Edge2, . . . , EdgeN}.

Banding edge lines 910, 912 of FIG. 9 illustrate two of the banding edge lines of the BEM and which are extracted at 804 of the technique 800.

At 806, the technique 800 generates a banding visibility map (BVM) from the resultant BEM of 804 of the technique 800. The technique 800 processes the BEM to yield (e.g., obtain, calculate, etc.) the element-wise banding visibility map. That is, for each pixel at a location (i, j) of the image, and which is on one of the labeled edges of the BEM (i.e., having a value of 1), a banding visibility value BVM(i, j) is obtained.

Staircase-like banding artefacts can appear similar to Mach Bands or Chevreul illusion where perceived edge contrast (due, for example, to edge enhancement) can be exaggerated by the human visual system. Explanations of the illusion can involve the center-surround excitatory-inhibitory pooling responses of retinal receptive fields. Thus, the technique 800 calculates a local banding visibility estimate based on edge contrast and perceptual masking effects.

Calculating the element-wise BVM can involve measuring (e.g., calculating) and integrating (e.g., combining, etc.) several edge visibility metrics. In an example, the edge visibility metrics can include a basic edge feature. The edge visibility metrics can include one or more visual masking metrics. The visual masking metrics can include a luminance masking metric. The visual masking metrics can include a texture masking metric. The visual masking metrics can include a cardinality masking metric. Fewer, more, other edge visibility metrics, or a combination thereof can be used.

The gradient magnitude G (i, j) at a pixel, which is at a location (i, j) of the image, can be used as the basic edge feature. As mentioned above, banding artefact can present as visible edges. As also described above, the Sobel gradient magnitude can be used as an edge visibility feature.

As edge visibility can also be affected by content of the image, visual masking can affect the subjective perception of banding. Thus, the technique 800 calculates one or more visual masking metrics. Visual masking is a phenomenon whereby the visibility of a visual stimulus (e.g., a banding edge) can be reduced by the presence of another stimulus, which is referred to as a mask.

The technique 800 can first compute, at each detected banding pixel in the BEM, local statistics, such as a local Gaussian-weighted mean on the image. In some examples, the technique 800 can also calculate a local Gaussian-weighted standard deviation (i.e., a sigma field) on the image.

The local mean can be calculated using formula (1); and the local standard deviation can be calculated using formula (2).

$$\mu(i, j) = \Sigma_{k=-K}^{K} \Sigma_{l=-L}^{L} w_{k,l} I(i-k, j-l) \tag{1}$$

$$\sigma(i, j) = \sqrt{\Sigma_{k=-K}^{K} \Sigma_{l=-L}^{L} w_{k,l} [I(i-k, j-l) - \mu(i,j)]^2} \tag{2}$$

In formulae (1) and (2), I can be the luminance plane of the image; (i, j) denote the spatial indices at detected pixels in the BEM with corresponding original pixel intensity I(i, j); $w = \{w_{k,l} | k=-K, \ldots, K, l=-L, \ldots, L\}$ can be a 2D isotropic Gaussian weighting function; K and L can define a local neighborhood of (i.e., a window around) the pixel centered at (i, j). In an example, the window size can be 9×9. Thus, K=L3=4. However, other window sizes are possible. The local mean $\mu(\cdot)$ and variance $\sigma(\cdot)$ maps can be used to estimate the local background luminance (i.e., the luminance masking metric) and/or the local complexity (i.e., the texture masking metric).

A luminance visibility transfer function (VTF$_l$) can be used to express luminance masking as a function of the local background intensity. It is noted that banding artefacts may remain visible even in very dark areas. As such, masking may be needed at very bright pixels only. Stated another way, banding artifacts can be visible in dark scenes but may not be very visible in bright scenes. As such, the visibility weighting can be relatively small at bright pixels but stay the same for dark pixels.

A luminance masking weight ($w_l$) can be computed at each pixel using formula (3).

$$w_l(i, j) = \begin{cases} 1 & \text{when } \mu(i, j) \leq \mu_0 \\ 1 - \alpha(\mu(i, j) - \mu_0)^\beta & \text{when } \mu(i, j) > \mu_0 \end{cases} \tag{3}$$

The luminance visibility transfer function is VTF$_l$=1−α$(\mu(i, j) - v_0)^\beta$. In formula (3), α and β are constants chosen to adjust the shape of the luminance visibility transfer function, and $\mu_0$ is a threshold local mean value. In an example, α=1.6×10$^{-5}$, β=2, and $\mu_0$=81. However, other values are possible.

A texture visibility transfer function (VTF$_t$) can be used to express the effects of texture masking. The texture visibility transfer function (VTF$_t$) can be defined to be inversely proportional to local image activity when an activity measure (i.e., the mean "sigma field") rises above threshold activity level, $\lambda_0$. The texture weighting function ($w_t$) can be derived using formulae (4) and (5).

$$w_c(i, j) = \begin{cases} 1 & \text{when } \lambda(i, j) \leq \lambda_0 \\ 1/[1 + (\lambda(i, j) - \lambda_0)]^\gamma & \text{when } \lambda(i, j) > \lambda_0 \end{cases} \tag{4}$$

$$\lambda(i, j) = \frac{1}{(2K+1)(2L+1)} \sum_{k=-K}^{K} \sum_{l=-L}^{L} \sigma(i-k, j-l) \quad (5)$$

In formulae (4) and (5), $\sigma(i, j)$ is as described with respect to formula (2); $\gamma$ can be a parameter that is used to tune the non-linearity of the visibility transfer function (VTF$_r$=1/[1+ $(\lambda(i, j)-\lambda_0)]^\gamma$); K and L are as described above; and $\lambda(i, j)$ is a measure of the local image activity round the pixel at (i, j).

Edge length can be a useful banding visibility feature. Thus, in some implementations, the technique 800 can define a visibility transfer function (VTF$_c$) that weights banding visibility by edge cardinality (e.g., size in number of pixels). The cardinality weighting function (w$_c$) can be derived using formula (6).

$$w_c(i, j) = \begin{cases} 0 & \text{when } |E(i, j)| \le c_0 \\ \left(|E(i, j)|/\sqrt{MN}\right)^\eta & \text{when } |E(i, j)| > c_0 \end{cases} \quad (6)$$

In formula (6), $E(i, j)=\{E \in BEM | (i, j) \in E\}$ is the set of banding edges passing through the location (i, j), $\eta$ is a parameter that adjusts the nonlinearity of the visibility transfer function (VTF$_c$), and $c_0$ is a threshold on minimal noticeable edge length above which banding edge visibility can be considered to be positively correlated to normalized edge length. M and N denote, respectively, the height and width of the image. The visibility transfer function VTF$_c$ is VTF$_c$=$(|E(i, j)|/\sqrt{MN})^\eta$. In an example, $c_0$ can be 16 and $\eta$ can be 0.5. However, other values are possible.

The overall visibility of an artefact can depend on the visual response to the artefact modulated by a concurrency of masking effects. The technique 800 can generate the banding visibility map using a product model of feature integration at each computed banding pixel to generate the banding visibility map (BVM). The BVM can be computed using formula (7).

$$BVM(i, j)=w_l(i, j) \cdot w_t(i, j) \cdot w_c(i, j) \cdot |G(i, j)| \quad (7)$$

In formula (7), $w_l$, $w_t$, and $w_c$ are, respectively, the luminance masking weights, the texture masking weights, and the cardinality masking weights, as described above; and $|G(i, j)|$ are the gradient magnitudes at locations (i, j). Thus, the gradient magnitudes (e.g., the Sobel gradient magnitudes) are scaled by the weights. As mentioned above, in some implementations, not all of the luminance masking weights, the texture masking weights, and the cardinality masking weights may be used. For example, if the cardinality masking weights are not used, then the formula (7) can be reduced to BVM(i, j)=$w_l(i, j) \cdot w_t(i, j) \cdot |G(i, j)|$. It is noted that BMV(i, j) can be calculated for only those locations where the banding edge map, BEM(i, j) is equal to 1.

At 808, the technique 800 generates the banding metric (BBAND index). In an example, the technique 800 can apply a worst p % percentile (i.e., predefined percentile) pooling to generate an average banding score from the extracted BVM. In an example, p=80; however, other values of the predefined percentile are possible.

Banding artefacts can occur in non-salient regions (e.g., the background) of an image while salient objects can catch more of a viewer's attention. Spatial information (SI) and temporal information (TI) can be used to indicate possible spatial and temporal distractors (e.g., masks) against banding visibility. The temporal information (TI) can be used to calculate a banding score of a video that includes the image. However, the temporal information (TI) is not calculated if a video banding index is not to be calculated.

The spatial information SI can be computed as the standard deviation of the pixel-wise gradient magnitude. The spatial information SI can be calculated using formula (8).

$$SI=\{std[G(i, j)]\} \quad (8)$$

In formula (8), G(I) is the gradient magnitude map of the image, as described above; std calculates the standard deviation over the pixels of the image I of the gradient profile map.

The temporal information TI can be calculated as the standard deviation of the absolute image differences on each frame of the video, of which the image is a frame. The temporal information TI can be based upon motion differences, M(i, j), which is the difference between the pixel values of the image I (which may be at temporal location n of the video) at the same location in space but at successive times or frames of the video. Thus, the motion differences can be computed as M(i, j)=$I_n$(i, j)−$I_{n-1}$(i, j), where $I_{n-1}$ is the image that precedes the image $I_n$ in display order. The temporal information TI can be computed using formula (9).

$$TI=\text{mean}\{std[M(i, j)]\} \quad (10)$$

In formula (10), the mean operator is across all frames (or at least across a selected subset of the frames) of the video. The spatial information SI and the temporal information TI can then be mapped by an exponential transfer function to generate weights w using formula (11). The larger the spatial information SI and the temporal information TI values are, the less visible the banding edges. This property is captured in (e.g., is encapsulated in, is the meaning of, etc.) formula (11), where banding visibility weights decrease exponentially as the spatial information SI and the temporal information TI values increase.

$$w_i(x)=\exp(-a_i x^{b_i}), i \in \{SI, TI\} \quad (11)$$

As such, using the formula (11) a spatial information weight $w_{SI}$ and a temporal information weight $W_{TI}$ can be calculated. In formula (11), $a_{SI}$ and $b_{SI}$ and $a_{TI}$ and $b_{TI}$ are constants that are chosen empirically using an initial parameter tuning procedure on a dataset; and x is either SI or TI.

The BBAND index of the image can be computed using formula (12) by applying visual percentile pooling and the spatial information weights to the BVM.

$$Q_{BBAND_I}(I) = w_{SI}(SI) \cdot \frac{1}{|x_{p\%}|} \sum_{(i,j) \in x_{p\%}} BVM, (i, j) \quad (12)$$

Formula (12) can be used to calculate the BBAND index of the image I, $Q_{BBAND_I}(I)$. $x_{p\%}$ is the index set of the largest $p^{th}$ percentile non-zero pixel-wise visibility values contained in the BVM of the image I, BVM$_I$.

Where the image is a frame of a video, a video-level BBAND metric ($Q_{BBAND_v}$) can be generated using formula (13) by averaging all frame-level banding scores, weighted by per-frame temporal information TI.

$$Q_{BBAND_v} = \frac{1}{N} \sum_{n=1}^{N} w_{TI}(TI_n) \cdot Q_{BBAND_I}(I_n) \quad (13)$$

Figures 10, 11:
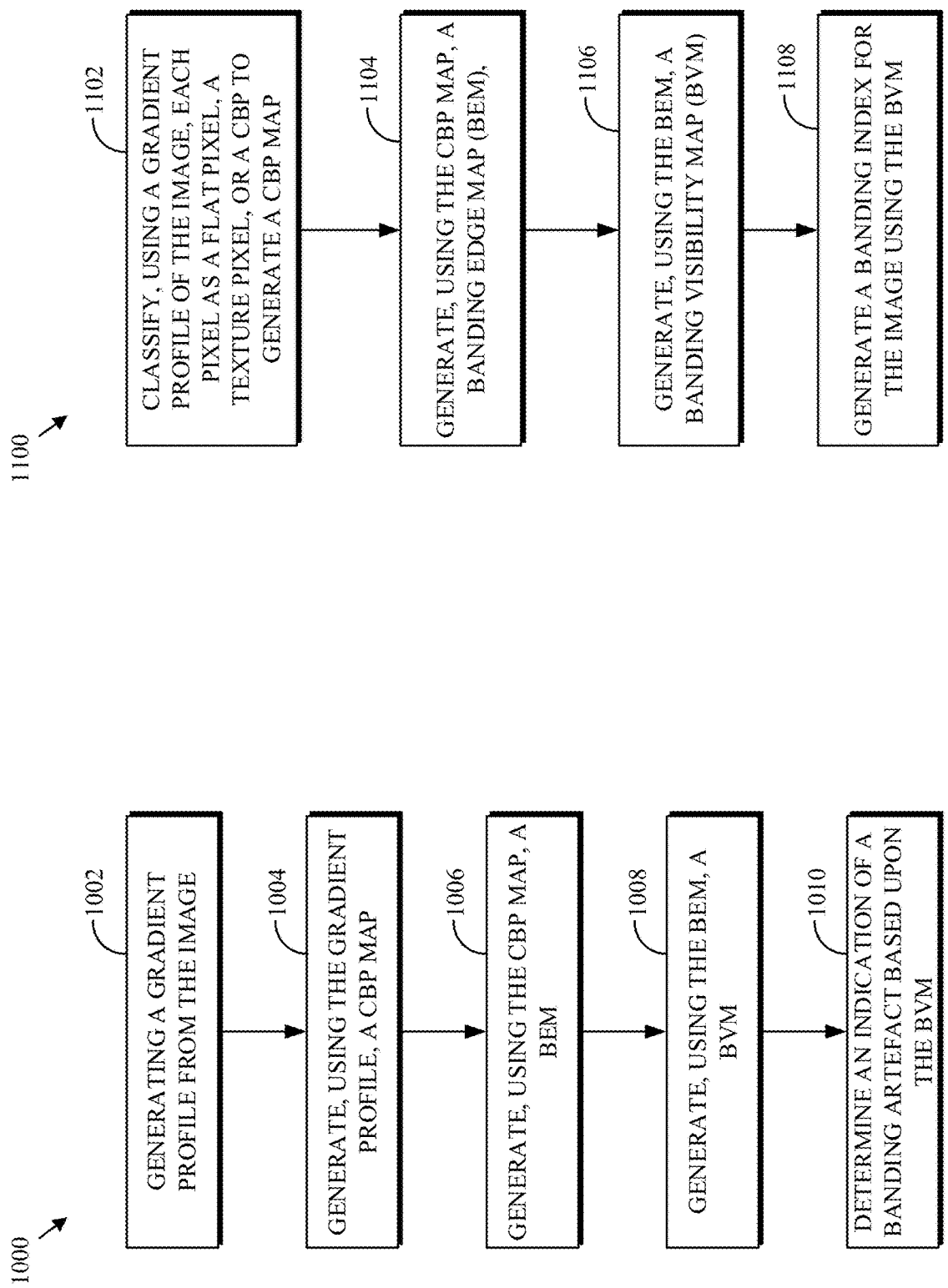
FIG. 10 is an example of a flowchart of a technique 1000 for no-reference banding artefact predictor according to implementations of this disclosure.
FIG. 11 is an example of a flowchart of a technique for no-reference banding artefact predictor according to implementations of this disclosure.

FIG. 10 is an example of a flowchart of a technique 1000 for no-reference banding artefact predictor according to implementations of this disclosure. The technique 1000 can be implemented, for example, as a software program that may be executed by computing devices such as transmitting station 102 or receiving station 106. The technique 1000 can be implemented by a software program that may be executed partially or fully by one of a blind banding detector and/or a debanding module, such as the BBAND 704 and the debanding module 706 of FIG. 7A, or the BBAND 760 and the debanding module 762 of FIG. 7B. The software program can include machine-readable instructions that may be stored in a memory such as the memory 204 or the secondary storage 214, and that, when executed by a processor, such as CPU 202, may cause the computing device to perform the technique 1000. The technique 1000 may be implemented in whole or in part in the post filtering stage 514 of the decoder 500. The technique 800 can be implemented using specialized hardware or firmware. Multiple processors, memories, or both, may be used.

The technique 1000 can receive an image or a frame of a video. The technique 800 calculates a banding index (e.g., BBAND index) of the image. In an example, the technique 1000 can receive the video and the technique 1000 can calculate a respective banding index for at least some of the frames of the video. The video can be a decoded bitstream that is produced by a decoder, such as the decoder 500 of FIG. 5. Thus, the video can be the frames of the output video stream 516 of FIG. 5. In an example, the technique 1000 can receive a compressed bitstream, such as the compressed bitstream 420. In such a case, the technique 1000 can include steps for decoding the compressed bitstream to produce an output video stream.

In an example, the image can be a RGB image. In such a case, the image can be converted to the YUV color space. Any processing described with respect to the image, or actions performed with the image, are assumed to be performed with respect to (e.g., on) a selected one of the Y, U, or V planes. In an example, the selected plane can be the luminance (i.e., Y) plane of the YUV image. More specifically, the technique 1100 can be used to measure a banding artefact using the luminance plane of the image. Thus, any references to a pixel or a pixel value at a location of the image can be interpreted to mean a luminance value of the pixel at that location.

At 1002, the technique 1000 can generate (e.g., calculate, obtain, determine, etc.) a gradient profile from the image. The gradient profile, G, includes respective gradient magnitudes of pixels of the image. The gradient profile can be as described above with respect to FIG. 8.

In an example, the technique 1000 can apply an edge-preserving filter to the image before generating the CBP map from the image to obtain an edge-preserved image. The edge-preserving filter can be as described with respect to FIG. 8. In an example, generating the gradient profile from the image can include calculating, using a Sobel operator, the gradient profile from the edge-preserved image.

At 1004, the technique 1000 can generate (e.g., calculate, generate, determine, etc.), using the gradient profile, a candidate banding pixel (CBP) map. The CBP map indicates pixels of the image having a gradient magnitude greater than a first threshold and smaller than a second threshold. The CBP map can be a binary map where each location of the CBP map corresponds to a pixel at the same location in the image. Each location of the CBP map can be such that a gradient magnitude of the gradient map of the corresponding pixel in the image is greater than a first threshold, T1, and smaller than a second threshold, T2. Stated another way, $CBP(i, j) = T1 < |G(i, j)| < T2$. Thus, pixels of the image satisfying the criterion can be set to a Boolean 1 in the CBP. The CBP can be as described above with respect to FIG. 8.

In an example, generating, using the gradient profile, the CBP map can include, on a first condition that the gradient magnitude being less than the first threshold, classifying the pixel corresponding to the gradient magnitude as a flat pixel; on a second condition that the gradient magnitude being greater than the second threshold, classifying the pixel corresponding to the gradient magnitude as a texture pixel; and, on a third condition that the gradient magnitude being between the first threshold and the second threshold, classifying the pixel corresponding to the gradient magnitude as a CBP.

At 1006, the technique 1000 can generate (e.g., calculate, generate, determine, etc.), using the CBP map, a banding edge map (BEM). The BEM can include connected banding edges of the image. The BEM indicates pixels of the CBP map that are connected with at least one other pixel of the CBP map. The BEM can be as described above with respect to FIG. 8. The BEM can be a binary map.

At 1008, the technique 1000 can generate, using the BEM, a banding visibility map (BVM). The BVM can include respective banding metrics for at least some pixels of the image. More specifically, the BVM can include respective banding metrics for pixels having a value of one (1) in the CBP. The BVM includes a respective value for a banding metric for each pixel indicated in the BEM, each value can be determined based upon corresponding pixels of the image. The BVM can be as described above with respect to FIG. 8.

In an example, generating the BVM can include, for each location of the at least some locations of the BEM, determining (e.g., calculating, obtaining, generating, etc.) a respective luminance mask (i.e., luminance value) using the BEM; determining a respective texture mask (i.e., texture value) using the BEM; and determining, using the respective luminance mask (i.e., luminance value) and the respective texture mask (i.e., texture value), the respective banding metric of the each location. A location in the BEM corresponds to a pixel location in the image. Thus, the BVM includes corresponding respective banding metrics for at least those locations of the CBP map having a certain value (e.g., 1). That is, for each pixel indicated in the BEM, the respective banding metric for the pixel can be determined using the respective luminance value and the respective texture value.

In an example, generating, using the BEM, the BVM can include determining a respective cardinality mask (i.e., cardinality value) for the each location using the BEM. That is, the respective cardinality value is determined for each pixel indicated in the BEM where the cardinality value indicates a number of pixels connected to the pixel in the BEM. The respective banding metric of the each location can be generated further using the respective cardinality mask.

At 1010, the technique 1000 can determine an indication (i.e., a banding index) of banding artefacts in the image based upon the BVM. The banding index can be as described above with respect to FIG. 8. In an example, the banding index can be generated by averaging at least some values of the BVM to generate a banding index of the image. In an example, the at least some values of the BVM correspond to a predefined percentile. In an example, the worst predefined percentile can be 80.

In an example, the image can be a frame of a video and the technique 1000 can further include applying, using the banding index, a debanding filter to the image and transcoding the video after applying the debanding filter, as described above with respect to the pre-processing scenario of FIG. 7A. In an example, the debanding filter is a smoothing filter where the degree of smoothing is selected based on the value of the banding index. In an example, the banding filter can be a dithering window of independent and identically distributed (i.i.d.) uniform noise (e.g., in a range [−2, 2] or some other range) added to at least some pixels of the luminance plane. In an example, the at least some pixels can be all the pixels of the luminance plane. In an example, only for each pixel of the BEM, noise can be added in a window that is centered at the pixel.

FIG. 11 is an example of a flowchart of a technique 1100 for no-reference banding artefact predictor according to implementations of this disclosure. The technique 1100 can be used to measure a banding artefact of an image. The image can be a YUV image. The image can be a single image or a frame of a video. More specifically, the technique 1100 can be used to measure a banding artefact using the luminance plane of the image. Thus, any references to a pixel or a pixel value at a location of the image can be interpreted to mean a luminance value of the pixel at that location.

The technique 1100 can be implemented, for example, as a software program that may be executed by computing devices such as transmitting station 102 or receiving station 106. The technique 1000 can be implemented by a software program that may be executed partially or fully by one of a blind banding detector and/or a debanding module, such as the BBAND 704 and the debanding module 706 of FIG. 7A, or the BBAND 760 and the debanding module 762 of FIG. 7B. The software program can include machine-readable instructions that may be stored in a memory such as the memory 204 or the secondary storage 214, and that, when executed by a processor, such as CPU 202, may cause the computing device to perform the technique 1100. The technique 1100 may be implemented in whole or in part in the post filtering stage 514 of the decoder 500. The technique 800 can be implemented using specialized hardware or firmware. Multiple processors, memories, or both, may be used.

At 1102, the technique 1100 can classify, using a gradient profile of the image, each pixel of the image as a flat pixel, a texture pixel, or a candidate banding pixel (CBP) to generate a CBP map. The gradient profile can be generated as described above. The CBP map can be as described above. The pixels of the image can be classified using a first threshold and a second threshold, as described above.

At 1104, the technique 1100 can generate, using the CBP map, a banding edge map (BEM). As described above with respect to FIG. 8, generating the CBP map can include retaining, in the CBP map, pixels having neighboring pixels that are not texture pixels; applying a non-maxima suppression to the pixels of the CBP map; gap-filling between disjointed pixels of the CBP map; edge-linking edges of the CBP map; and removing, from the CBP, edges that are shorter than a threshold size.

At 1106, the technique 1100 can generate, using the BEM, a banding visibility map (BVM). The BVM includes a respective banding metric for at least some locations of the BEM, as described above.

At 1108, the technique 1100 can generate the banding index for the image using the BVM. In an example, the banding index can be generated by averaging at least some values of the BVM.

For simplicity of explanation, the techniques 800, 1000, and 1100 of FIGS. 8, 10, and 11, respectively, are depicted and described as series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify," or any variations thereof, include selecting, ascertaining, computing, looking up, receiving, determining, establishing, generating, or otherwise identifying or determining in any manner whatsoever using one or more of the devices shown in FIG. 1.

Further, for simplicity of explanation, although the figures and descriptions herein may include sequences or series of operations or stages, elements of the techniques disclosed herein can occur in various orders and/or concurrently. Additionally, elements of the techniques disclosed herein may occur with other elements not explicitly presented and described herein. Furthermore, one or more elements of the techniques described herein may be omitted from implementations of techniques in accordance with the disclosed subject matter.

The implementations of the transmitting station 102 and/or the receiving station 106 (and the algorithms, techniques, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of transmitting station 102 and the receiving station 106 do not necessarily have to be implemented in the same manner.

Further, in one implementation, for example, transmitting station 102 and the receiving station 106 can be implemented using a computer program that, when executed, carries out any of the respective techniques, algorithms, and/or instructions described herein. In addition or alternatively, for example, a special-purpose computer/processor, which can contain specialized hardware for carrying out any of the techniques, algorithms, or instructions described herein, can be utilized.

The transmitting station 102 and the receiving station 106 can, for example, be implemented on computers in a real-time video system. Alternatively, the transmitting station 102 can be implemented on a server, and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting station 102 and a receiving station 106 implementation schemes are available. For example, the receiving station 106 can be a generally stationary personal computer rather than a portable communications device, and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available. The above-described implementations have been described in order to allow easy understanding of the application and are not limiting. On the contrary, the application covers various modifications and equivalent arrangements included within the scope of the appended claims, which scope is to be accorded the broadest interpretation as is permitted under the law so as to encompass all such modifications and equivalent arrangements.

What is claimed is:

1. A method of measuring a banding artefact in an image, comprising:
    generating a gradient profile from the image, wherein the gradient profile comprises respective gradient magnitudes of pixels of the image;
    generating, using the gradient profile, a candidate banding pixel (CBP) map that identifies a subset of the pixels of the image that are not flat pixels or texture pixels, wherein each location of the CBP map is such that a gradient magnitude of the gradient profile of a corresponding pixel of the image is greater than a first threshold and smaller than a second threshold;
    generating, using the CBP map, a banding edge map (BEM), wherein the BEM comprises connected banding edges of the image;
    generating, using the BEM, a banding visibility map (BVM), wherein the BVM comprises a respective banding metric for at least some pixels of the image; and
    determining an indication of banding artefacts in the image based upon the BVM.

2. The method of claim 1, wherein generating, using the BEM, the BVM comprises:
    for each location of at least some locations of the BEM:
        determining a respective luminance value using the BEM;
        determining a respective texture value using the BEM; and
        determining, using the respective luminance value and the respective texture value, the respective banding metric of the location.

3. The method of claim 2, wherein determining, using the BEM, the BVM further comprises:
    determining a respective cardinality value for the location using the BEM, wherein the respective banding metric of the location is determined further using the respective cardinality value.

4. The method of claim 1, wherein determining the indication of the banding artefacts in the image based upon the BVM comprises:
    averaging at least some values of the BVM to generate a banding index of the image.

5. The method of claim 4, wherein the at least some values of the BVM correspond to a predefined percentile.

6. The method of claim 1, further comprising:
    applying, to generate an edge-preserved image, an edge-preserving filter to the image before generating the CBP map from the image.

7. The method of claim 6, wherein generating the gradient profile from the image comprises:
    calculating, using a Sobel operator, the gradient profile from the edge-preserved image.

8. The method of claim 1, wherein generating, using the gradient profile, the CBP map, comprises:
    on a first condition that the gradient magnitude is less than the first threshold, classifying a pixel corresponding to the gradient magnitude as the flat pixel;
    on a second condition that the gradient magnitude is greater than the second threshold, classifying the pixel corresponding to the gradient magnitude as the texture pixel; and
    on a third condition that the gradient magnitude is between the first threshold and the second threshold, classifying the pixel corresponding to the gradient magnitude as the CBP.

9. The method of claim 1, wherein the image is a frame of a video, the method further comprising:
    applying a debanding filter to the image; and
    transcoding the video after applying the debanding filter.

10. The method of claim 9, wherein the debanding filter is a smoothing filter.

11. The method of claim 1, wherein generating, using the CBP map, the BEM comprises:
    retaining, in the CBP map, pixels having neighboring pixels that are not texture pixels;
    applying a non-maxima suppression to the pixels of the CBP map;
    gap-filling between disjointed pixels of the CBP map; and
    edge-linking edges of the CBP map.

12. The method of claim 11, wherein generating, using the CBP map, the BEM further comprises:
    removing, from the CBP, edges that are shorter than a threshold size.

13. An apparatus for measuring a banding artefact in an image, comprising:
    a processor configured to:

generate a gradient profile from the image, wherein the gradient profile comprises respective gradient magnitudes of pixels of the image;

generate, using the gradient profile, a candidate banding pixel (CBP) map that identifies a subset of the pixels of the image that are not flat pixels or texture pixels, wherein each location of the CBP map is such that a gradient magnitude of the gradient profile of a corresponding pixel of the image is greater than a first threshold and smaller than a second threshold;

generate, using the CBP map, a banding edge map (BEM), wherein the BEM comprises connected banding edges of the image;

generate, using the BEM, a banding visibility map (BVM), wherein the BVM comprises a respective banding metric for at least some locations of the BEM; and determine an indication of banding artefacts in the image based upon the BVM.

14. The apparatus of claim 13, wherein to generate, using the BEM, the BVM comprises to:

for each location of at least some locations of the BEM:
determine a respective luminance value using the BEM;
determine a respective texture value using the BEM; and
determine using the respective luminance value and the respective texture value, the respective banding metric of the location.

15. The apparatus of claim 14, wherein to generate, using the BEM, the BVM further comprises to:

generate a respective cardinality value for the location using the BEM, wherein the respective banding metric of the location is generated further using the respective cardinality value.

16. The apparatus of claim 13, wherein to determine the indication of the banding artefacts in the image based upon the BVM comprises to:

average at least some values of the BVM to generate a banding index of the image.

17. The apparatus of claim 13, wherein the processor is configured to:

apply an edge-preserving filter to the image before generating the CBP map from the image.

18. The apparatus of claim 13, wherein the gradient profile is generated using a Sobel operator.

19. The apparatus of claim 13, wherein to generate, using the gradient profile, the CBP map, comprises to:

on a first condition that the gradient magnitude is less than the first threshold, classify a pixel corresponding to the gradient magnitude as a flat pixel;

on a second condition that the gradient magnitude is greater than the second threshold, classify the pixel corresponding to the gradient magnitude as a texture pixel; and on a third condition that the gradient magnitude is between the first threshold and the second threshold, classify the pixel corresponding to the gradient magnitude as a CBP.

20. The apparatus of claim 13, wherein the image is a frame of a video, and wherein the processor is configured to:

apply a debanding filter to the image; and encode the video after applying the debanding filter, wherein the debanding filter is a smoothing filter.

* * * * *